US012219684B2

(12) United States Patent
Teng et al.

(10) Patent No.: US 12,219,684 B2
(45) Date of Patent: Feb. 4, 2025

(54) MICROWAVE HEATING APPARATUS

(71) Applicant: WAVE POWER TECHNOLOGY INC., Toufen (TW)

(72) Inventors: Hsuan-Hao Teng, Taichung (TW); Han-Ying Chen, Hsinchu (TW)

(73) Assignee: WAVE POWER TECHNOLOGY INC., Toufen (TW)

( * ) Notice: Subject to any disclaimer, the term of this patent is extended or adjusted under 35 U.S.C. 154(b) by 642 days.

(21) Appl. No.: 17/528,855

(22) Filed: Nov. 17, 2021

(65) Prior Publication Data

US 2023/0156877 A1 May 18, 2023

(51) Int. Cl.
*H05B 6/70* (2006.01)

(52) U.S. Cl.
CPC ............. *H05B 6/707* (2013.01); *H05B 6/705* (2013.01)

(58) Field of Classification Search
CPC ............. H01J 37/3222; H01J 37/32192; H01J 37/32522; H01J 37/32229; H01J 37/32238; H01J 37/32293; H01J 37/32935; H01J 37/32266; H05B 6/707; H05B 6/78; H01Q 1/26
See application file for complete search history.

(56) References Cited

U.S. PATENT DOCUMENTS

| | | | | |
|---|---|---|---|---|
| 2002/0000437 A1 | 1/2002 | Bartoletti et al. | | |
| 2010/0059510 A1 | 3/2010 | Ristola et al. | | |
| 2012/0186972 A1* | 7/2012 | Li | B01J 19/126 | 422/186 |
| 2015/0223295 A1 | 8/2015 | Uchida et al. | | |

FOREIGN PATENT DOCUMENTS

| | | |
|---|---|---|
| CN | 102878589 A | 1/2013 |
| CN | 101954266 B | 3/2013 |
| CN | 103884030 A | 6/2014 |
| CN | 108886845 A | 11/2018 |
| JP | H03103019 U | 10/1991 |
| JP | H053098 A | 1/1993 |
| JP | 2007000774 A | 1/2007 |

(Continued)

OTHER PUBLICATIONS

Takebe, JPH053098A_Description.pdf (Year: 1993).*

*Primary Examiner* — Vy T Nguyen
(74) *Attorney, Agent, or Firm* — RABIN & BERDO, P.C.

(57) ABSTRACT

A microwave heating apparatus has a magnetron, a circulator, a heating assembly, and an end assembly. The heating assembly has a base waveguide tube and a guiding tube obliquely mounted through the base waveguide tube. An included angle between the guiding tube line and the base waveguide tube is smaller than 90 degrees. The end assembly includes a reflecting component having a reflecting surface facing toward the guiding tube, and an adjusting module for adjusting a distance between the reflecting component and the guiding tube. By adjusting the included angle between the guiding tube and the base waveguide tube, an inclined angle of the reflecting surface of the reflecting component and the distance defined between the reflecting component and the guiding tube, a best impedance matching of the microwave can be set according to impedance change of liquid to be heated and heating efficacy of the microwave heating apparatus can be increased.

6 Claims, 5 Drawing Sheets

(56) References Cited

FOREIGN PATENT DOCUMENTS

| | | | |
|---|---|---|---|
| JP | 2013117150 | A | 6/2013 |
| JP | 2015161331 | A | 9/2015 |
| JP | 2016096875 | A | 5/2016 |
| JP | 2018043079 | A | 3/2018 |
| JP | 2020080233 | A | 5/2020 |

* cited by examiner

MICROWAVE HEATING APPARATUS

BACKGROUND OF THE INVENTION

1. Field of the Invention

The present invention relates to a heating apparatus, especially to a microwave heating apparatus.

2. Description of the Prior Art(s)

Nowadays, one way of heating corrosive liquid is usually indirect heating. However, since said indirect heating is time-consuming and energy-consuming, efficiency of the whole process of the indirect heating is low. With reference to FIGS. 4 and 5, another way of heating the corrosive liquid is microwave heating. The theory of the microwave heating is the process of heating a dielectric material in an alternating electric field. Due to properties of the dielectric material, the dielectric material is heated by means of dielectric loss produced in the dielectric material when the dielectric material is subjected to an electromagnetic field. In practice, the microwave heating is applied to chemical process or liquid for rapid heating, distillation, thermal catalysis, thermal chemical reaction, etc.

A conventional microwave heating apparatus includes a magnetron 90, a circulator 91, a tuner 92, a heating tube 93, and a moving short 94. The magnetron 90 is used to generate microwave. The circulator 91 is used to protect a microwave source from microwave that is reflected from a rear end of the conventional microwave heating apparatus. The heating tube 93 is provided with a guiding tube 95 that is mounted through the heating tube 93. The guiding tube 95 extends perpendicular to a propagation direction of the microwave and is for liquid to be heated to flow through. The tuner 92 and the moving short 94 is used to adjust impedance matching of the microwave, such that the liquid to be heated can be well heated by the microwave while passing through the heating tube 93.

However, when chemical liquid is heated by the microwave and temperature of the chemical liquid increases, the relation between dielectric constant or dielectric loss of the chemical liquid and frequencies of the microwave is functional, and the dielectric constant and the dielectric loss of the chemical liquid are highly correlated with the temperature of the chemical liquid. With increase of the temperature of the chemical liquid, the dielectric constant and the dielectric loss change dramatically.

Thus, electrical properties of material to be heated change during the heating process, which causes the impedance matching to change constantly. Consequently, efficiency of the microwave heating is constantly changing during the heating process, such that the efficiency of the microwave heating and the heating effect are unstable.

In order to overcome the above-mentioned problem, the expensive and automatic tuner 92 is used to automatically adjust the impedance when the impedance changes during the heating process. However, in addition to be expensive, the tuner 92 is mechanically operated to adjust the impedance. The impedance that changes rapidly is often unable to become perfect match.

To overcome the shortcomings, the present invention provides a microwave heating apparatus to mitigate or obviate the aforementioned problems.

SUMMARY OF THE INVENTION

The main objective of the present invention is to provide a microwave heating apparatus having a magnetron, a circulator, a heating assembly, and an end assembly. A front end of the circulator is connected to the magnetron.

The heating assembly has a base waveguide tube and a guiding tube. The base waveguide tube has an inlet port and a connecting port. The inlet port is formed in a front end of the base waveguide tube, and the front end of the base waveguide tube is connected with a rear end of the circulator. The connecting port is formed in a rear end of the base waveguide tube. The base waveguide tube has an imaginary axis defined through the front end of the base waveguide tube and the rear end of the base waveguide tube. The guiding tube is mounted through and securely mounted on the base waveguide tube and has an imaginary central line defined along an elongation direction of the guiding tube. An included angle between the imaginary central line and the imaginary axis is smaller than 90 degrees.

The end assembly includes a reflecting component and an adjusting module. The reflecting component is movably mounted in the base waveguide tube, is disposed between the guiding tube and the connecting port and has a reflecting surface facing toward the guiding tube. The adjusting module is mounted on the rear end of the base waveguide tube, is connected to the reflecting component, and selectively drives the reflecting component to adjust a distance defined between the reflecting component and the guiding tube.

By adjusting the included angle between the imaginary central line and the imaginary axis, an inclined angle of the reflecting surface of the reflecting component and the distance defined between the reflecting component and the guiding tube, a best impedance matching of the microwave can be set according to impedance change of liquid to be heated, so as to be suitable for different liquids. Moreover, an expensive auto tuner can be omitted, such that cost of the microwave heating apparatus can be saved and system complexity of the microwave heating apparatus can be reduced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
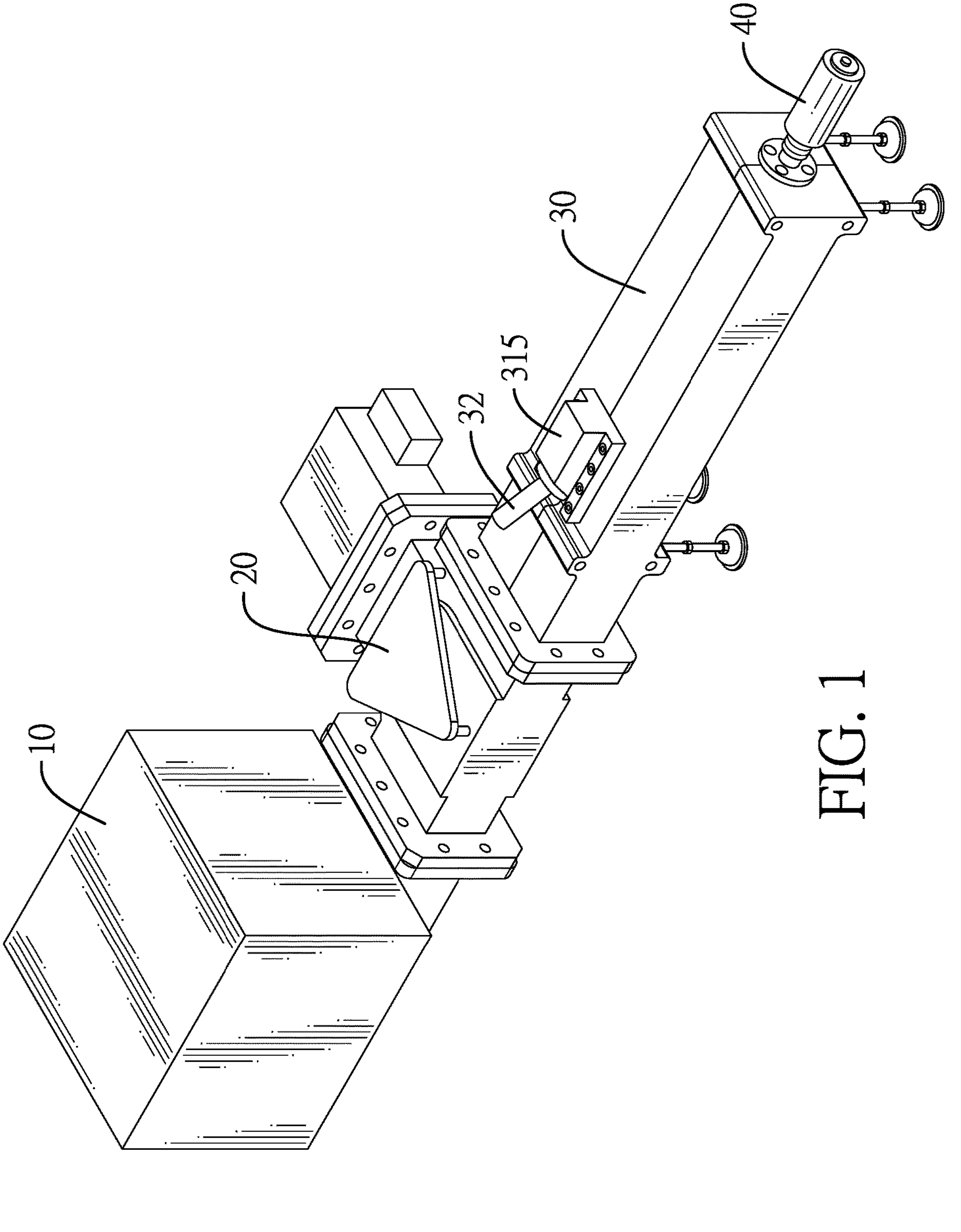
FIG. 1 is a perspective view of a microwave heating apparatus in accordance with the present invention.

With reference to FIG. 1, a microwave heating apparatus in accordance with the present invention comprises a magnetron 10, a circulator 20, a heating assembly 30, and an end assembly 40.

The magnetron 10 is disposed at a front end of the microwave heating apparatus and is used to generate microwave. Since the magnetron 10 is conventional, a more detailed description of the magnetron 10 is omitted.

The circulator 20 has a front end connected to the magnetron 10. The circulator 20 is used to protect a microwave source from microwave that is reflected from a rear end of the microwave heating apparatus. Since the circulator 20 is conventional, a more detailed description of the circulator 20 is omitted.

Figure 2:
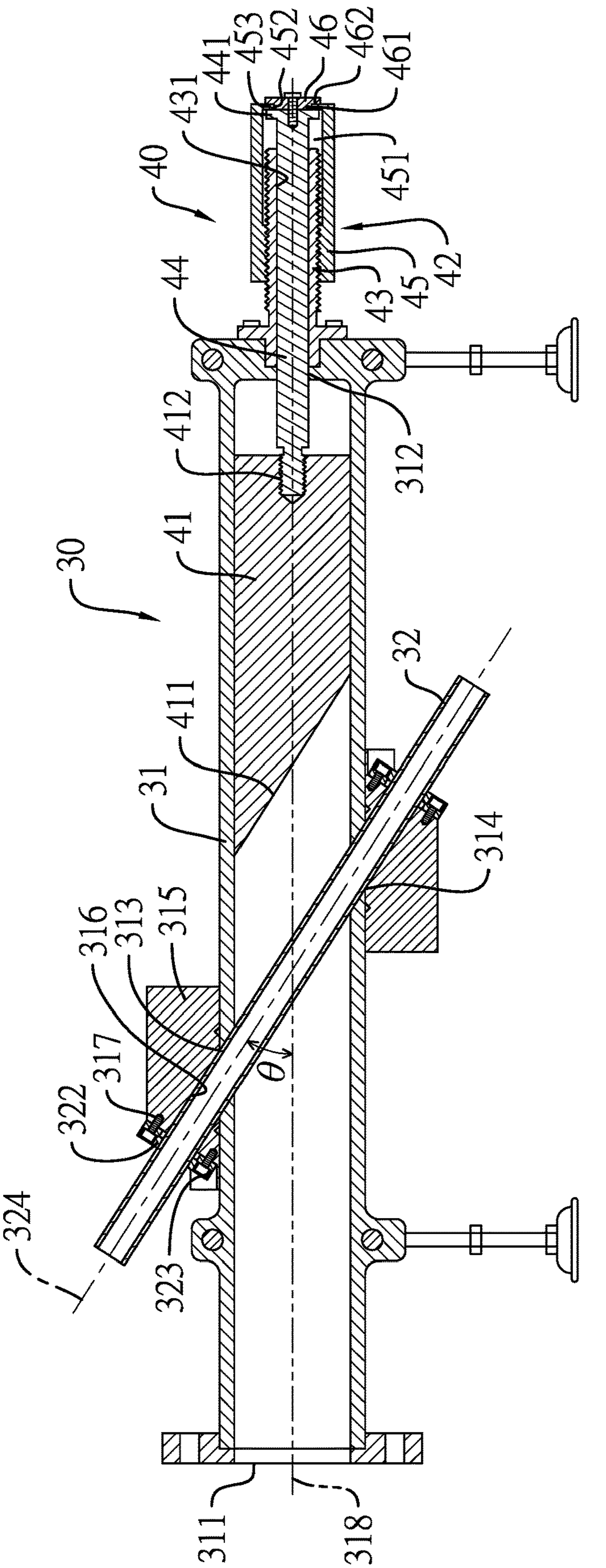
FIG. 2 is a cross-sectional side view of the microwave heating apparatus in FIG. 1.
Figure 3:
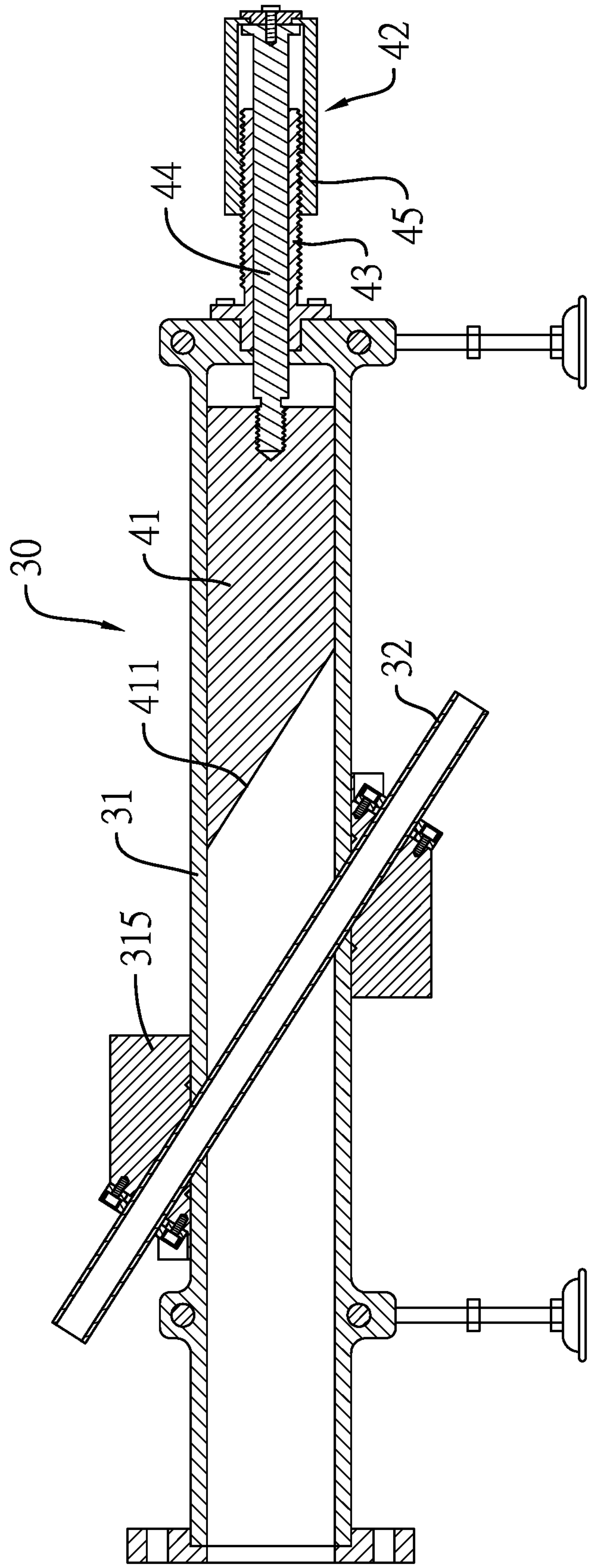
FIG. 3 is an operational cross-sectional side view of the microwave heating apparatus in FIG. 1.
Figure 4:
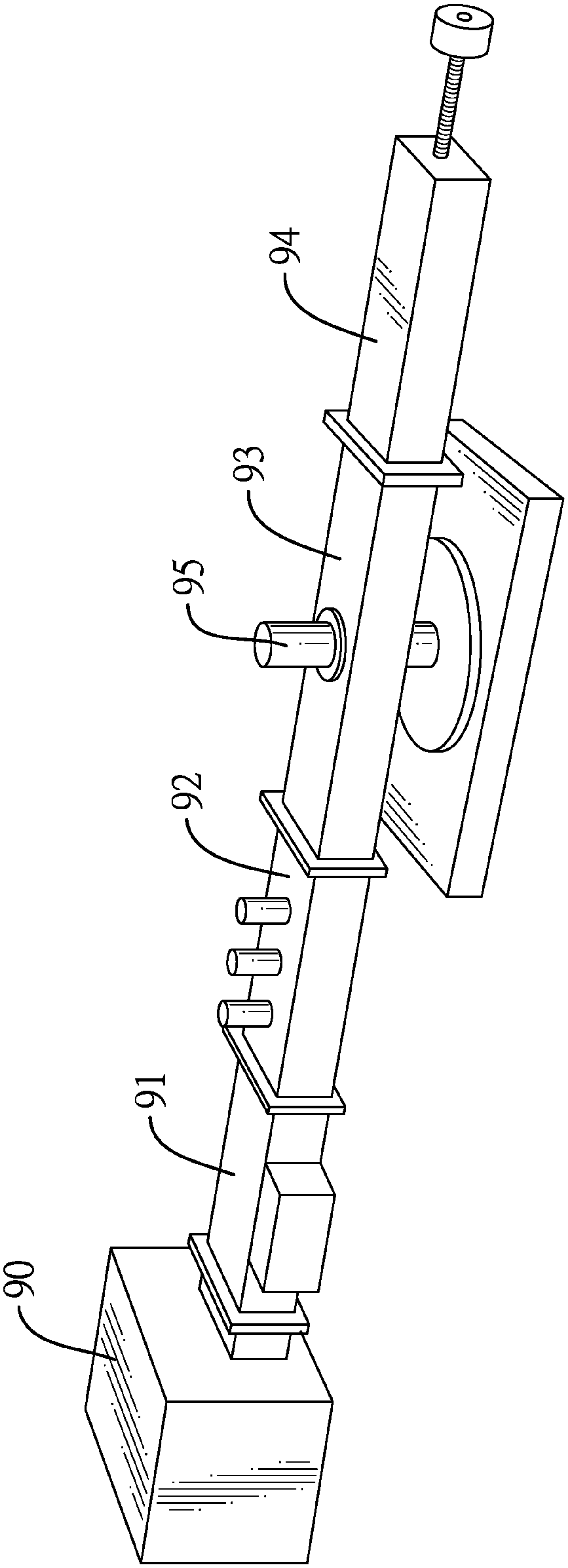
FIG. 4 PRIOR ART
FIG. 4 is a perspective view of a conventional microwave heating apparatus in accordance with the prior art.
Figure 5:
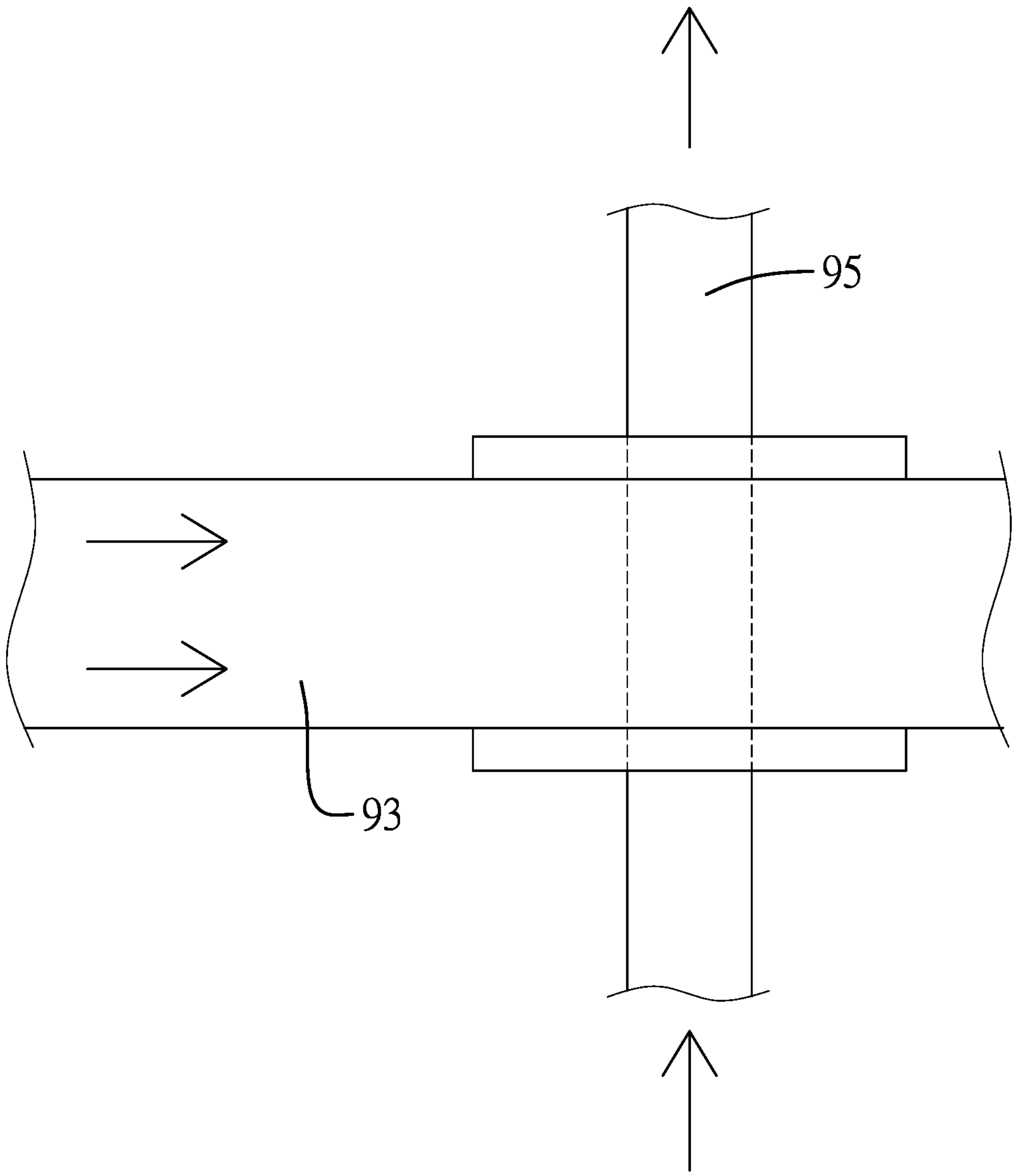
FIG. 5 PRIOR ART
FIG. 5 is an enlarged side view of the conventional microwave heating apparatus in FIG. 4.

With further reference to FIGS. 1 to 3, the heating assembly 30 has a base waveguide tube 31, two mounting seats 315, and a guiding tube 32.

The base waveguide tube 31 is hollow, is rectangular in cross-section, and has an inlet port 311, a connecting port 312, an upper mounting hole 313 and a lower mounting hole 314. The inlet port 311 is formed in a front end of the base waveguide tube 31. The front end of the base waveguide tube 31 is connected with a rear end of the circulator 20. The connecting port 312 is formed in a rear end of the base waveguide tube 31. The upper mounting hole 313 and the lower mounting hole 314 are obliquely formed through an upper sidewall and a lower sidewall of the base waveguide tube 31 respectively and are coaxial with each other.

The two mounting seats 315 are securely mounted on an outer side surface of the base waveguide tube 31. Each of the mounting seats 315 has a through hole 316 and multiple threaded holes 317. The through hole 316 is formed through the mounting seat 315. The through hole 316 of one of the mounting seats 315 aligns with the upper mounting hole 313. The through hole 316 of the other one of the mounting seats 315 aligns with the lower mounting hole 314. Each of the threaded holes 317 has an internal thread.

Moreover, the base waveguide tube 31 has an imaginary axis 318. The imaginary axis 318 is an imaginary line of a central axis of the base waveguide tube 31 and is defined through the front end of the base waveguide tube 31 and the rear end of the base waveguide tube 31.

The guiding tube 32 is hollow and is made of quartz. However, material of the guiding tube 32 is not limited to quartz, and the guiding tube 32 may be made of any material that allows the microwave to pass through and does not absorb the microwave.

The guiding tube 32 is mounted through the through holes 316 of the two mounting seats 315 and the upper mounting hole 313 and the lower mounting hole 314 of the base waveguide tube 31, is securely mounted on the base waveguide tube 31, and has an imaginary central line 324. The imaginary central line 324 is defined along an elongation direction of the guiding tube 32. An included angle θ between the imaginary central line 324 and the imaginary axis 318 is smaller than 90 degrees.

The guiding tube 32 is further is provided with two fastening seats 322. The two fastening seats 322 are securely mounted around the guiding tube 32, are separately disposed on the guiding tube 32, and are securely connected with the two mounting seats 315 respectively. Specifically, each of the fastening seats 322 has multiple fastening holes 323 aligning with the threaded holes 317 of a corresponding one of the mounting seats 315 respectively. Multiple fasteners are mounted through the fastening holes 323 of the fastening seats 322 respectively and are engaged in the threaded holes 317 of the two mounting seats 315. However, the way of securely mounting the guiding tube 32 on the base waveguide tube 31 is not limited to the above-described structure. The guiding tube 32 may be directly connected with the upper sidewall and the lower sidewall of the base waveguide tube 31.

The end assembly 40 includes a reflecting component 41 and an adjusting module 42.

The reflecting component 41 is elongated and corresponds in shape to an interior of the base waveguide tube 31. The reflecting component 41 is movably mounted in the base waveguide tube 31, is disposed between the guiding tube 32 and the connecting port 312, and has a reflecting surface 411 and a connecting hole 412. The reflecting surface 411 is formed on a front end of the reflecting component 41, is an inclined plane, and faces toward the guiding tube 32. An inclined angle of the reflecting surface 411 can be decided according to actual needs of users. The connecting hole 412 is formed in a rear end of the reflecting component 41. An internal thread is formed around the connecting hole 412.

The adjusting module 42 is mounted on the rear end of the base waveguide tube 31, is connected to the reflecting component 41, and selectively drives the reflecting component 41 to adjust a distance defined between the reflecting component 41 and the guiding tube 32.

Specifically, the adjusting module 42 includes a screw rod 43, a connecting rod 44, a holding rod 45 and a connecting plate 46.

The screw rod 43 has an external thread, a front end, and an axial hole 431. The front end of the screw rod 43 is securely connected to the rear end of the base waveguide tube 31. The axial hole 431 is formed through the front end of the screw rod 43 and a rear end of the screw rod 43 and aligns with the connecting port 312 of the base waveguide tube 31.

The connecting rod 44 is mounted through the axial hole 431 of the screw rod 43 and the connecting port 312 of the base waveguide tube 31 and has an external thread and an annular protrusion 441. The external thread of the connecting rod 44 is formed around a front end of the connecting rod 44. The front end of the connecting rod 44 protrudes in the connecting hole 412 of the reflecting component 41 and the external thread of the connecting rod 44 engages with the internal thread that is formed around the connecting hole 412. The annular protrusion 441 is formed around a rear end of the connecting rod 44.

The holding rod 45 is mounted around the rear end of the connecting rod 44 and the rear end of the screw rod 43 and has a combining recess 451, a bottom hole 452, and a bottom panel 453. The combining recess 421 is formed in a front end of the holding rod 45. An internal thread is formed around the combining recess 421 and engages with the external thread of the screw rod 43, such that the holding rod 45 is rotatable relative to the screw rod 43. The bottom hole 452 is formed through a bottom defined in the combining recess 421. The bottom panel 453 is formed around the bottom hole 452.

The connecting plate 46 has a combining portion 461 and a limiting portion 462. The combining portion 461 and the limiting portion 462 are oppositely formed on the connecting plate 46. An outer diameter of the combining portion 461 is smaller than an outer diameter of the limiting portion 462. The combining portion 461 is mounted in the bottom hole 452 of the holding rod 45 and abuts against the connecting rod 44. The connecting plate 46 is fastened to the connecting rod 44 via a fastener. The bottom panel 453 of the holding rod 45 is loosely held between the limiting portion 462 of the connecting plate 46 and the annular protrusion 441 of the connecting rod 44. When the holding rod 45 rotates relative to the screw rod 43, the connecting rod 44 and the reflecting component 41 are driven to rotate accordingly. However, the way of driving the reflecting component 41 to rotate is not limited to the above-described structure. The adjusting module 42 may be designed according to users' needs as long as the distance between the reflecting component 41 and the guiding tube 32 can be adjusted.

With reference to FIGS. 1 and 2, when the microwave heating apparatus is in use, an input pipeline and an output pipeline are connected to two ends of the guiding tube 32 respectively. The liquid to be heated is transported by the input pipeline and the output pipeline to flow through the guiding tube 32. With decrease of the included angle θ formed between the guiding tube 32 and the base waveguide tube 31, impedance bandwidth becomes wider and a length of the guiding tube 32 in the base waveguide tube 31 becomes longer. Thus, when assembling the microwave heating apparatus of the present invention, the mounting seats 315 allowing the guiding tube 32 to have a suitable inclined angle can be chosen according to the kind of the liquid to be heated. With the proper included angle θ between the guiding tube 32 and the base waveguide tube 31, a suitable impedance bandwidth can be formed.

Specifically, by using the mounting seats 315 with their through holes 316 having different inclined angles, the guiding tube 32 incline in different angles, such that the included angle θ can be set. Moreover, the inclined angle of the reflecting surface 411 of the reflecting component 41 can be adjusted according to the inclined angle of the guiding tube 32, and the inclined angle of the reflecting surface 411 can be adjusted simply by replacing the reflecting component 41 with another reflecting component 41 having the reflecting surface 411 of another inclined angle.

When the magnetron 10 emits the microwave to heat the liquid flowing through the guiding tube 32, impedance properties of the liquid change with temperature of the liquid. The impedance bandwidth can be adjusted according to change of the impedance of the liquid. With reference to FIGS. 2 and 3, when heating different liquid with microwave, the best impedance matching of the microwave can be set by turning the holding rod 45 to adjust the distance between the reflecting surface 411 of the reflecting component 41 and the guiding tube 32, so as to be suitable for different liquids.

As all possible change in the dielectric properties of the liquid fall within range of the matching bandwidth, dramatic change in efficiency of the microwave heating can be avoided and heating efficiency can be increased. Moreover, an expensive auto tuner can be omitted, such that cost of the microwave heating apparatus can be saved and system complexity of the microwave heating apparatus can be reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A microwave heating apparatus comprising:
- a magnetron;
- a circulator having a front end connected to the magnetron;
- a heating assembly having
  - a base waveguide tube having
    - an inlet port formed in a front end of the base waveguide tube, and the front end of the base waveguide tube connected with a rear end of the circulator; and
    - a connecting port formed in a rear end of the base waveguide tube, wherein the base waveguide tube has an imaginary axis defined through the front end of the base waveguide tube and the rear end of the base waveguide tube; and
  - a guiding tube mounted through and securely mounted on the base waveguide tube and having an imaginary central line defined along an elongation direction of the guiding tube, wherein an included angle between the imaginary central line and the imaginary axis is smaller than 90 degrees; and
- an end assembly including
  - a reflecting component movably mounted in the base waveguide tube, disposed between the guiding tube and the connecting port and having a reflecting surface, and the reflecting surface facing toward the guiding tube; and
  - an adjusting module mounted on the rear end of the base waveguide tube, connected to the reflecting component, and selectively driving the reflecting component to adjust a distance defined between the reflecting component and the guiding tube.

2. The microwave heating apparatus as claimed in claim 1, wherein
- the base waveguide tube is rectangular in cross-section and has an upper mounting hole and a lower mounting hole, and the upper mounting hole and the lower mounting hole are obliquely formed through an upper sidewall and a lower sidewall of the base waveguide tube respectively and are coaxial with each other; and
- the guiding tube is mounted through the upper mounting hole and the lower mounting hole of the base waveguide tube and is securely connected with the base waveguide tube.

3. The microwave heating apparatus as claimed in claim 1, wherein
- the heating assembly further has two mounting seats securely mounted on an outer side surface of the base waveguide tube, and each of the mounting seats has
  - a through hole formed through the mounting seat, wherein the through hole of one of the mounting seats aligns with the upper mounting hole and the through hole of the other one of the mounting seats aligns with the lower mounting hole; and
  - multiple threaded holes, and each of the threaded holes has an internal thread;
- the guiding tube is mounted through the through holes of the mounting seats and is provided with two fastening seats, the two fastening seats are securely mounted around the guiding tube, and each of the fastening seats has multiple fastening holes aligning with the threaded holes of a corresponding one of the mounting seats respectively; and
- multiple fasteners are mounted through the fastening holes of the fastening seats respectively and are engaged in the threaded holes of the two mounting seats.

4. The microwave heating apparatus as claimed in claim 2, wherein
- the heating assembly further has two mounting seats securely mounted on an outer side surface of the base waveguide tube, and each of the mounting seats has
  - a through hole formed through the mounting seat, wherein the through hole of one of the mounting seats aligns with the upper mounting hole and the through hole of the other one of the mounting seats aligns with the lower mounting hole; and
  - multiple threaded holes, and each of the threaded holes has an internal thread;

the guiding tube is mounted through the through holes of the mounting seats and is provided with two fastening seats, the two fastening seats are securely mounted around the guiding tube, and each of the fastening seats has multiple fastening holes aligning with the threaded holes of a corresponding one of the mounting seats respectively; and multiple fasteners are mounted through the fastening holes of the fastening seats respectively and are engaged in the threaded holes of the two mounting seats.

5. The microwave heating apparatus as claimed in claim 3, wherein the reflecting component further has a connecting hole formed in a rear end of the reflecting component and disposed opposite to the reflecting surface, wherein an internal thread is formed around the connecting hole; and the adjusting module includes a screw rod having an external thread;

a front end securely connected to the rear end of the base waveguide tube; and an axial hole formed through the front end of the screw rod and a rear end of the screw rod and aligning with the connecting port of the base waveguide tube;

a connecting rod mounted through the axial hole of the screw rod and the connecting port of the base waveguide tube and having an external thread formed around a front end of the connecting rod, wherein the front end of the connecting rod protrudes in the connecting hole of the reflecting component and the external thread of the connecting rod engages with the internal thread that is formed around the connecting hole; and an annular protrusion formed around a rear end of the connecting rod;

a holding rod mounted around the rear end of the connecting rod and the rear end of the screw rod and having a combining recess formed in a front end of the holding rod, wherein an internal thread is formed around the combining recess and engages with the external thread of the screw rod;

a bottom hole formed through a bottom defined in the combining recess; and a bottom panel formed around the bottom hole; and a connecting plate having a combining portion and a limiting portion, the combining portion and the limiting portion oppositely formed on the connecting plate, and an outer diameter of the combining portion being smaller than an outer diameter of the limiting portion, wherein the combining portion is mounted in the bottom hole of the holding rod and abuts against the connecting rod;

the connecting plate is fastened to the connecting rod; and the bottom panel of the holding rod is held between the limiting portion of the connecting plate and the annular protrusion of the connecting rod.

6. The microwave heating apparatus as claimed in claim 4, wherein the reflecting component further has a connecting hole formed in a rear end of the reflecting component and disposed opposite to the reflecting surface, wherein an internal thread is formed around the connecting hole; and the adjusting module includes a screw rod having an external thread;

a front end securely connected to the rear end of the base waveguide tube; and an axial hole formed through the front end of the screw rod and a rear end of the screw rod and aligning with the connecting port of the base waveguide tube;

a connecting rod mounted through the axial hole of the screw rod and the connecting port of the base waveguide tube and having an external thread formed around a front end of the connecting rod, wherein the front end of the connecting rod protrudes in the connecting hole of the reflecting component and the external thread of the connecting rod engages with the internal thread that is formed around the connecting hole; and an annular protrusion formed around a rear end of the connecting rod;

a holding rod mounted around the rear end of the connecting rod and the rear end of the screw rod and having a combining recess formed in a front end of the holding rod, wherein an internal thread is formed around the combining recess and engages with the external thread of the screw rod;

a bottom hole formed through a bottom defined in the combining recess; and a bottom panel formed around the bottom hole; and a connecting plate having a combining portion and a limiting portion, the combining portion and the limiting portion oppositely formed on the connecting plate, and an outer diameter of the combining portion being smaller than an outer diameter of the limiting portion, wherein the combining portion is mounted in the bottom hole of the holding rod and abuts against the connecting rod;

the connecting plate is fastened to the connecting rod; and the bottom panel of the holding rod is held between the limiting portion of the connecting plate and the annular protrusion of the connecting rod.

* * * * *